Dec. 29, 1959   W. HAUSMANN   2,918,907
HYDRAULIC TRANSMISSION
Filed Feb. 26, 1957   4 Sheets-Sheet 1

WERNER HAUSMANN
*INVENTOR.*

BY

AGENT

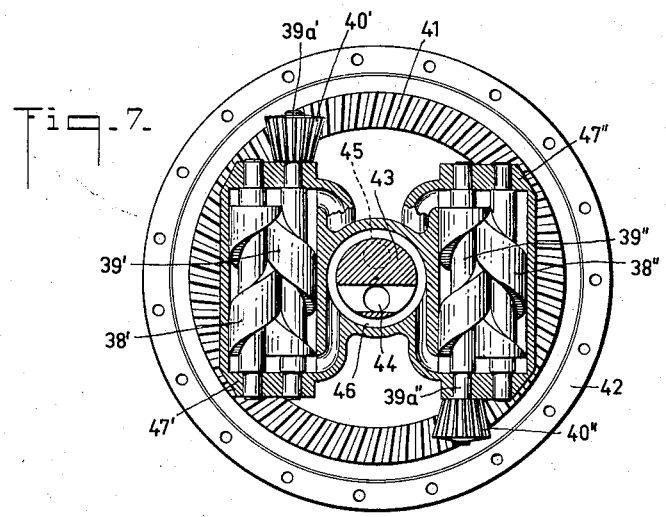
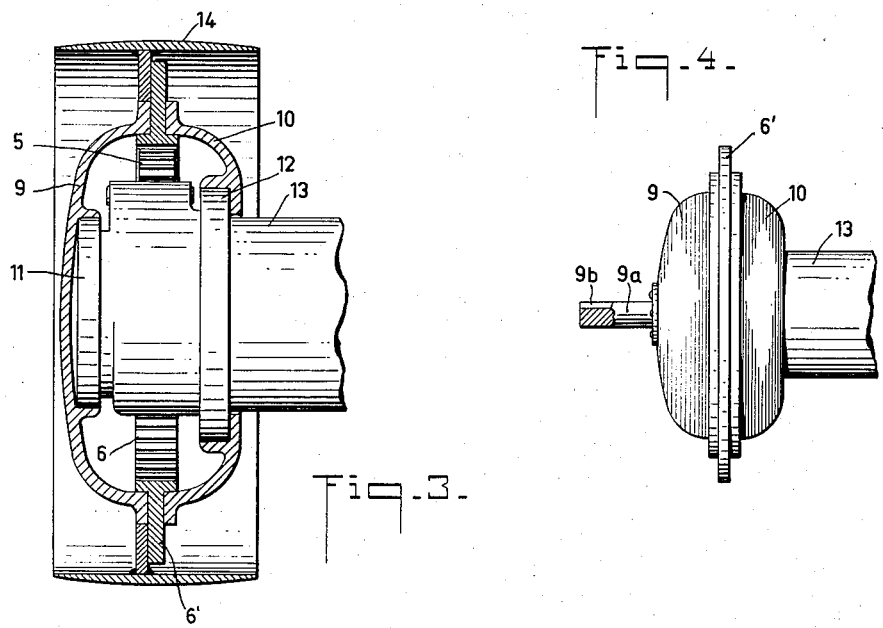

Dec. 29, 1959   W. HAUSMANN   2,918,907
HYDRAULIC TRANSMISSION
Filed Feb. 26, 1957   4 Sheets-Sheet 3

WERNER HAUSMANN
INVENTOR.

BY

AGENT

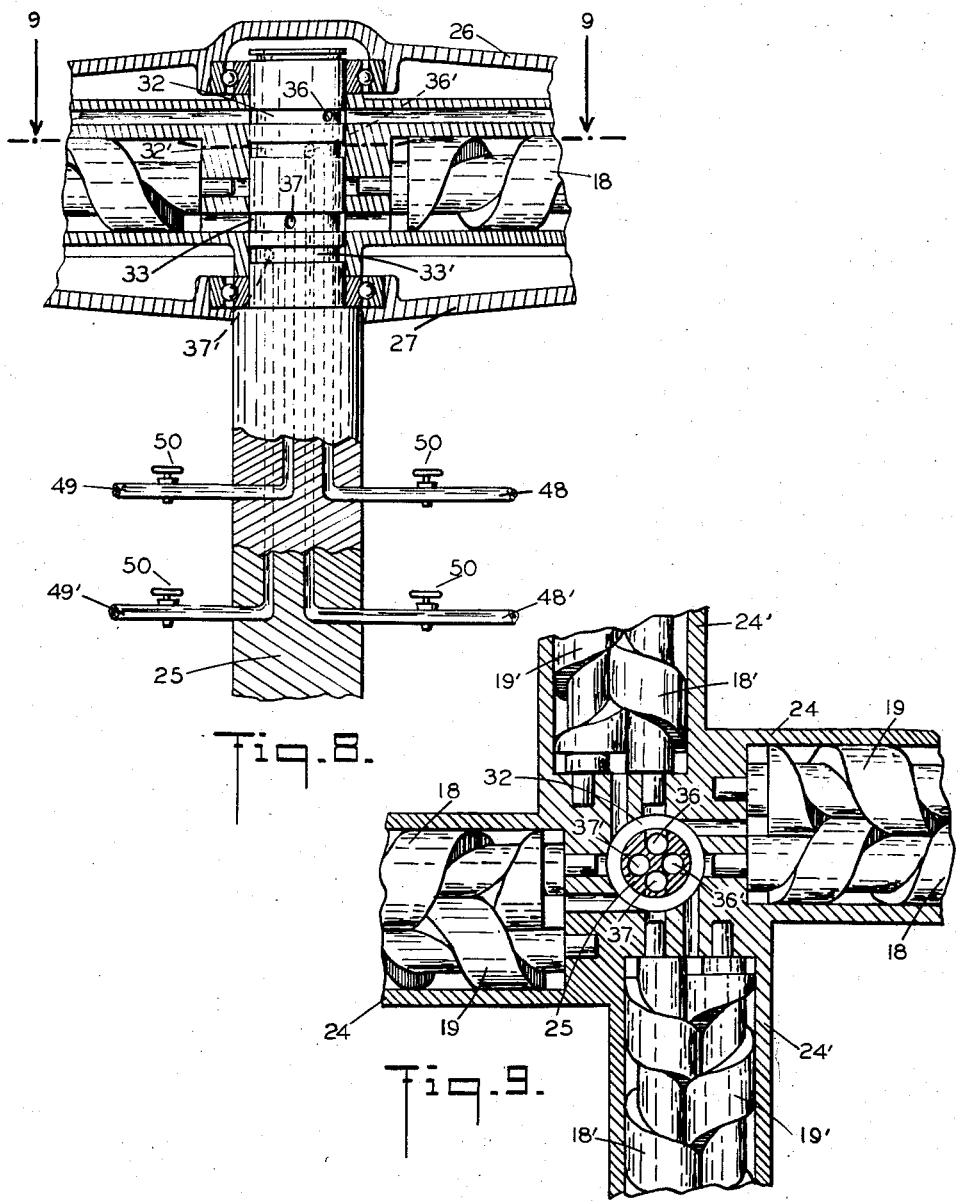

United States Patent Office 2,918,907
Patented Dec. 29, 1959

2,918,907

HYDRAULIC TRANSMISSION

Werner Hausmann, Uthleben, near Nordhausen, Germany, assignor to VEB Schlepperwerk Nordhausen, Nordhausen, Germany, a corporation of Germany Application February 26, 1957, Serial No. 642,406

Claims priority, application Germany December 13, 1956

8 Claims. (Cl. 121—70)

My present invention relates to a hydraulic transmission for automotive vehicles and has for its principal object the provision of a transmission of this character which is compact enough to be lodged in the driving wheels of such vehicles.

Earlier proposals along these lines include the use of a radial hydraulic motor having the usual cylinders, pistons, piston rods, crank shaft and valves. Since a motor of this type cannot start from dead center, the presence of a plurality of such cylinders and pistons (generally not less than three) is invariably required. Such assemblies, accordingly, are relatively complex and ordinarily too bulky to be used in small driving wheels, such as those provided on passenger cars.

A more particular object of this invention is to provide a hydraulic transmission of simpler construction, less voluminous, and easier to install and to service than previously known devices of this description.

Still another specific object of the invention is to provide a hydraulic transmission having a constant though possibly adjustable ratio of input to output torque, i.e. one whose driving elements do not pass through any dead-center position.

A hydraulic transmission according to the instant invention has one or more driving elements each comprising a pair of parallel, interengaging screws to which oil or some other hydraulic fluid under pressure is axially admitted so as to exert upon these screws a torque causing them to turn in opposite directions. Advantageously, meshing gears or equivalent coupling means are provided for positively interconnecting the screws to synchronize their rotation without any direct contact between the two screw threads. The rotation of one of the spindles can be directly transmitted, through gears or the like, to a vehicle wheel or any other load.

A transmission of this description is readily reversible by a change in the direction of the operating fluid. It can easily be installed in wheels, pulleys or the like of small or large dimensions and is capable of accelerating them from standstill to a desired maximum speed (or, conversely, of slowing their rotation down to zero). By the joint use of several screw pairs with different dimensions (e.g. different angles of pitch), to which the operating fluid may be selectively directed, it is possible to vary the effective transmission ratio of the system so as to accommodate different loads or operating conditions. Also, the power output of the transmission may be varied by selectively activating all or less than all of the available screw pairs.

The invention will be described in greater detail with reference to the accompanying drawing in which:

Fig. 3 is a view similar to Fig. 1 but with some parts shown in elevation and with the vehicle wheel replaced by a pulley;

Fig. 4 is an elevational view of a transmission similar to that of Figs. 1–3 but with a driving shaft connected thereto instead of a wheel or a pulley;

Fig. 7 is a face view, partly in section, of a wheel hub (e.g. for a motorcycle) equipped with still another hydraulic transmission according to the invention;

Fig. 8 is a fragmentary sectional view similar to Fig. 5, showing a modification; and Fig. 9 is a cross-sectional view taken on the line 9—9 of Fig. 8.

Figure 1:
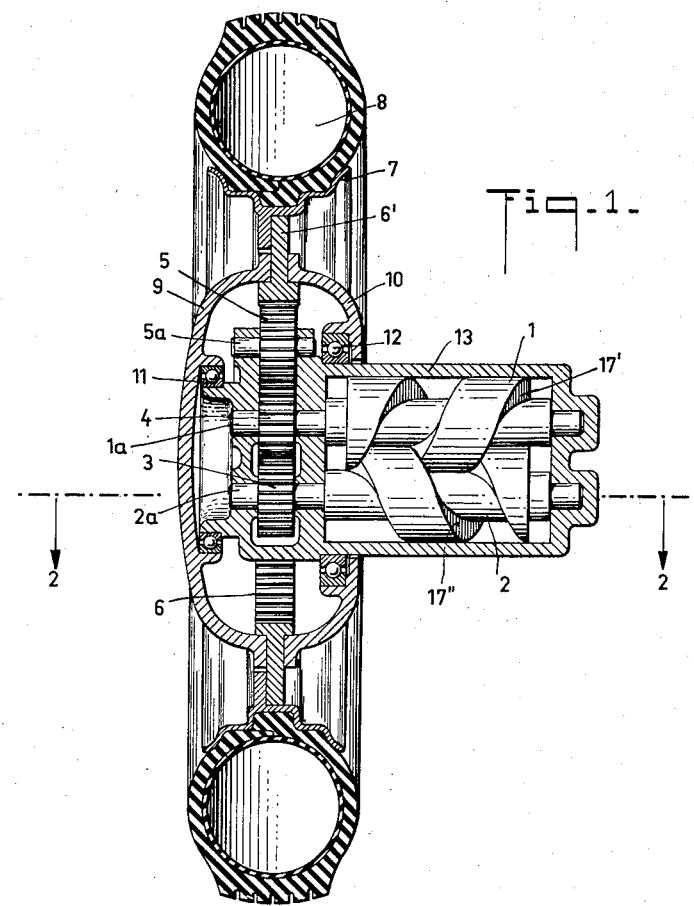
Fig. 1 shows, in axial cross-section, a transmission according to the invention installed in a wheel of an automotive vehicle.
Figure 2:
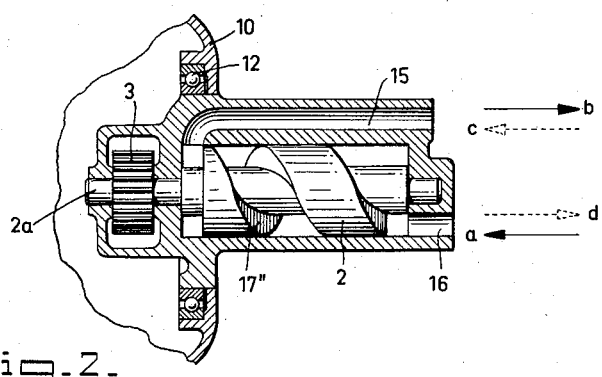
Fig. 2 is a fragmentary sectional view taken on the line 2—2 of Fig. 1.

In Figs. 1 and 2 there is shown a housing 13 in which two screws 1, 2 with rectangular thread profiles are horizontally journaled adjacent each other so that their threads intermesh without a touching of their flanks 17', 17". The screws are maintained in this relative position by a pair of meshing gears 3, 4 which are respectively keyed to the spindles 2a, 1a thereof. A pinion 5, journaled in housing 13 by means of a stud shaft 5a, meshes with the gear 4 and engages an internally toothed ring 6 which is centrally clamped between two disks 9 and 10. These two disks are rotatably supported, by means of ball bearings 11 and 12, on the housing 13 and together form a sealed chamber adapted to contain a pool of lubricating oil (not shown).

The flange 6' of ring 6, projecting outwardly between the disks 9 and 10, supports the rim 7 of an automobile wheel which in turn carries the tire 8. Motion is imparted to this wheel by means of a pump (not shown), driven by the vehicle motor, which for movement in one direction (e.g. forward) forces a hydraulic fluid, such as oil under pressure, into an axial passage 16 of housing 13 as indicated by solid arrow *a* in Fig. 2. This fluid, in passing from right to left as viewed in Figs. 1 and 2, impinges upon the flanks 17', 17" and causes the screws 1 and 2 to turn in opposite directions, thus imparting rotation to the gears 3, 4, pinion 5, ring 6 and, ultimately, tire 8. The spent fluid is returned to the pump system by way of an axial passage 15 as indicated by solid arrow *b*. If it is desired to drive in the opposite direction (e.g. rearward), the operation of the pump is reversed so that the fluid enters the housing 13 through passage 15 and leaves it through passage 16 as indicated by dotted arrows *c* and *d*. It will be seen that housing 13, acting as a fixed gudgeon for wheel 6—10, so encloses the screws 1, 2 that oil can pass between ports 15 and 16 only by way of the axially sliding spaces formed by the threads thereof.

The arrangement of Fig. 3 differs from that of Figs. 1 and 2 in that the wheel rim 7 with tire 8 has been replaced by a pulley 14 directly supported on flange 6'. In Fig. 4 the wheel and the pulley have been omitted and a driven shaft 9a, provided with a keyway 9b through which it may be coupled to an agricultural machine or some other load, is directly secured to disk 9.

Figure 5:
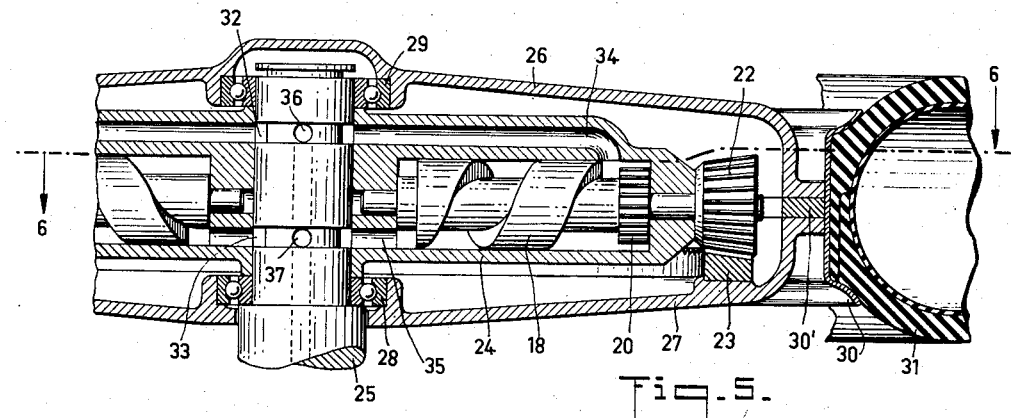
Fig. 5 is a radial cross-section of a larger wheel accommodating a more elaborate hydraulic transmission embodying the invention.
Figure 6:
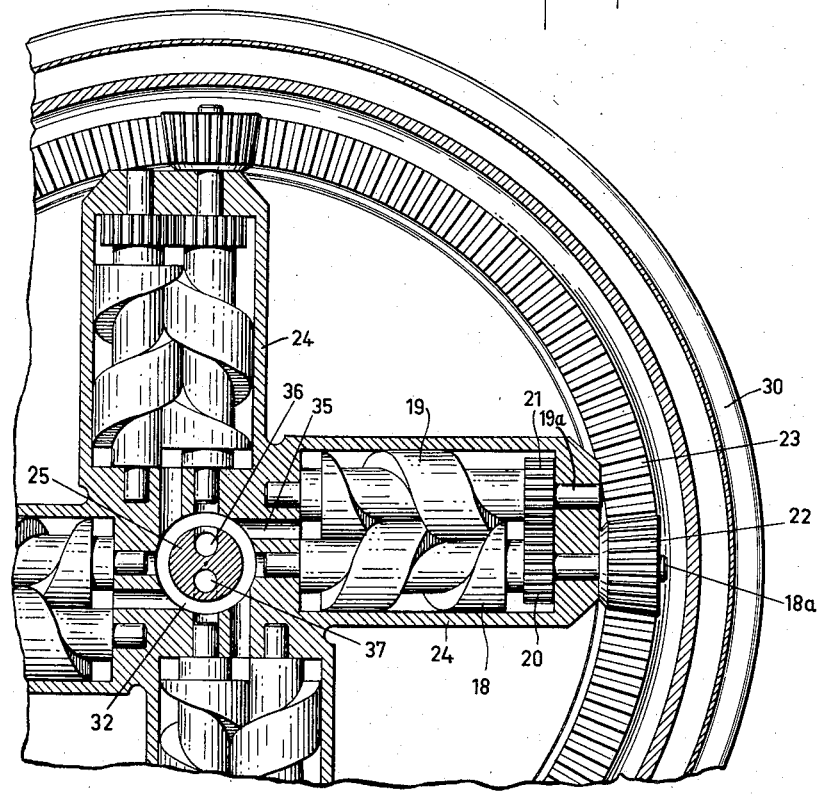
Fig. 6 is a cross-sectional view taken on the line 6—6 of Fig. 5.

In Figs. 5 and 6 there has been shown a type of transmission adapted to be used with large wheels, e.g. those of trucks, tractors, bulldozers, locomotives and other heavy-duty equipment. The housing of this transmission comprises four chambers 24 extending approximately radially outwardly from a gudgeon 25; the latter is provided with ducts 36, 37 communicating respectively, with two annular grooves 32, 33. Each housing chamber 24 has two passages 34, 35 which are in continuous communication with the grooves 32, 33, respectively, for supplying fluid under pressure to the meshing pair of screws 18, 19 within the chamber. Again, depending upon the desired direction of rotation, the fluid may enter at duct 36 and leave at duct 37 or vice versa.

The wheel in this embodiment comprises two disks 26 and 27, rotatably journaled on gudgeon 25 by means of ball bearings 28, 29, between which the flange 30' of rim 30 is clamped; a tire 31 is supported by the rim 30. Gears 20 and 21, fixedly mounted on the spindles 18a and 19a of screws 18 and 19, respectively, again insure proper co-operation between these spindles and serve to prevent contact between the flanks thereof. Disk 27 carries a toothed ring 23 which meshes with four beveled pinions 22 each keyed onto a respective spindle 18a.

The operation of the system of Figs. 5 and 6 is analogous to that of the transmission shown in Figs. 1 and 2. It will be understood that the number of housing chambers 24 may also be greater or less than four.

Fig. 7 shows a modification of the system just described which is particularly adapted for use with smaller wheels, e.g. those of motorcycles. The housing here comprises two parallel chambers 47', 47", integral with gudgeon 43, in which are lodged the two pairs of meshing screws 38', 39' and 38", 39". Spindles 39a', 39a" of screws 39', 39" carry respective bevel gears 40', 40" engaging the teeth of a ring 41 secured to the wheel hub 42, the latter being rotatably journaled on gudgeon 43 by suitable bearings not shown. It will be noted that the teeth of ring 41 are non-radially arrayed for proper meshing with the teeth of gears 40', 40".

Gudgeon 43 is provided with two axially extending ducts 44, 45 for the admission and the return of hydraulic fluid. Duct 44 communicates with an annular groove 46 leading to the entrance ports of chambers 47', 47"; duct 45 communicates with a similar groove (not shown) leading to the exit ports of these chambers. The admission of fluid will, under the assumed conditions, result in counterclockwise movement of the hub 42. If this movement is to be reversed, the fluid will be admitted through duct 45 and will return through duct 44. It will be understood that the screws of Fig. 7 may also be positively interconnected, as shown in the preceding embodiments, by meshing gears or the like designed to reduce wear and friction.

If the ducts 36, 37 and the annular grooves 32, 33 in Figs. 5 and 6 are multiplied and pairs of opposite chambers 24 have their inlet and outlet ports arranged to communicate with different ones of these grooves so that some or all pairs of chambers may be selectively supplied with fluid, depending upon road conditions and other load-determining factors, the dimensions and/or the pitch of the two (or more) sets of screws may be made different so as to make available different transmission ratios, e.g. for starting, low speed and normal drive. This has been illustrated in Figs. 8 and 9 where the added ducts have been designated 36', 37', these ducts communicating with respective annular grooves 32' and 33' in gudgeon 25. The inlets 48, 49 and 48', 49' communicating with the several grooves are provided with valves 50 for selectively controlling the admission of fluid to these grooves. It will be noted that one pair of diametrically opposite chambers 24 is of larger cross section than the other pair 24', the two interengaging screws 18, 19 and 18', 19' in these chambers differing similarly in their dimensions.

I claim:

1. In a transmission system, in combination, a rotatable ring, a fixed gudgeon positioned centrally of said ring, a housing rigid with said gudgeon forming a plurality of chambers each with an inlet port and an outlet port, a pair of screws with intermeshing threads rotatably positioned in each of said chambers between said ports, a source of fluid under pressure, said housing closely surrounding said screws and providing a passage for said fluid between said ports by way of said threads only, conduit means provided in said gudgeon for connecting said source to said inlet ports whereby pressure of said fluid is converted into rotation of said screws in opposite directions, and coupling means connecting one of said screws of each pair with said ring for rotative entrainment of the latter.

2. A transmission according to claim 1, comprising a pair of disks rigid with said ring and forming therewith a fluid-tight chamber rotatable about said housing.

3. The combination according to claim 1, wherein all of said chambers extend substantially radially outwardly from said gudgeon.

4. The combination according to claim 1, wherein said chambers are arranged on opposite sides of said gudgeon, the screws in said chambers being all parallel to one another.

5. The combination according to claim 1, further comprising gear means in each chamber positively interconnecting said screws for simultaneous rotation.

6. The combination according to claim 1, wherein said coupling means comprises a set of gear teeth on said ring and a plurality of gears in mesh with said teeth, each of said gears being positively coupled with at least one of the screws in a respective chamber.

7. The combination according to claim 6, wherein the screws in a first one of said chambers have a pitch different from that of the screws in a second one of said chambers, further comprising control means at said conduit means for varying the torque ratio of the system by selectively connecting said source to either of said first and second chambers.

8. In combination, a rotatable ring, a fixed gudgeon centrally of said ring, a housing rigid with said gudgeon forming a first and a second pair of diametrically opposite chambers extending substantially radially outwardly of said gudgeon, each of said chambers being provided with an inlet port and an outlet port, two screws with intermeshing threads of relatively small pitch rotatably positioned between said ports in each of the chambers of said first pair, two screws with intermeshing threads of relatively large pitch rotatably positioned between said ports in each of the chambers of said second pair, a source of fluid under pressure, said housing closely surrounding said screws and providing a passage for said fluid between said ports by way of said threads only, conduit means for selectively connecting said source to the inlet ports of either of said pairs of chambers whereby pressure of said fluid is converted into rotation of the corresponding screws in opposite directions, and coupling means connecting one of the screws of each of said chambers with said ring in rotative entrainment of the latter with a torque ratio dependent upon the pair of chambers connected.

References Cited in the file of this patent

UNITED STATES PATENTS

| | | |
|---|---|---|
| 1,287,268 | Edwards | Dec. 10, 1918 |
| 1,987,698 | Montelius | Jan. 15, 1935 |
| 2,485,687 | Bailey | Oct. 25, 1949 |
| 2,694,982 | Quartullo et al. | Nov. 23, 1954 |